United States Patent
Kusano et al.

(10) Patent No.: US 10,443,951 B2
(45) Date of Patent: Oct. 15, 2019

(54) EVAPORATOR

(71) Applicant: TOYOTA JIDOSHA KABUSHIKI KAISHA, Toyota-shi, Aichi-ken (JP)

(72) Inventors: Yuya Kusano, Susono (JP); Hiroki Awano, Susono (JP); Seiji Yamashita, Gotenba (JP); Manabu Orihashi, Toyota (JP); Yu Hoshino, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/838,495

(22) Filed: Dec. 12, 2017

(65) Prior Publication Data

US 2018/0164040 A1    Jun. 14, 2018

(30) Foreign Application Priority Data

Dec. 13, 2016  (JP) ................................. 2016-241540

(51) Int. Cl.
| | |
|---|---|
| *F28D 15/04* | (2006.01) |
| *F28D 15/02* | (2006.01) |
| *F28F 21/08* | (2006.01) |
| *F28F 3/12* | (2006.01) |
| *G06F 1/20* | (2006.01) |

(52) U.S. Cl.
CPC ....... *F28D 15/0266* (2013.01); *F28D 15/043* (2013.01); *F28D 15/046* (2013.01); *F28F 21/08* (2013.01); *F28F 3/12* (2013.01); *F28F 2255/18* (2013.01); *G06F 1/20* (2013.01)

(58) Field of Classification Search
CPC ...... F28D 15/02; F28D 15/0233; F28D 15/04; F28D 15/043; F28D 15/046
See application file for complete search history.

(56) References Cited

U.S. PATENT DOCUMENTS

| | | | |
|---|---|---|---|
| 6,948,556 B1 * | 9/2005 | Anderson | ........... F28D 15/0266 165/104.26 |
| 2004/0040328 A1 | 3/2004 | Patel et al. | |
| 2007/0267180 A1 | 11/2007 | Asfia et al. | |
| 2010/0186931 A1 | 7/2010 | Obara et al. | |

(Continued)

FOREIGN PATENT DOCUMENTS

| | | |
|---|---|---|
| JP | 2004-022682 A | 1/2004 |
| JP | 2005-086204 A | 3/2005 |
| JP | 2007-309639 A | 11/2007 |

(Continued)

*Primary Examiner* — Eric S Ruppert
(74) *Attorney, Agent, or Firm* — Sughrue Mion, PLLC (57) ABSTRACT

To provide an evaporator capable of suppressing reduction in heat transport amount while also preventing an increase in the pressure loss of a working fluid.
An evaporator comprising a container and a dividing layer adapted to divide the inside of the container into a liquid reservoir chamber and a vapor chamber, wherein the dividing layer includes a heat blocking layer on the liquid reservoir chamber side and a wick layer on the vapor chamber side, a gap is formed between the heat blocking layer and the wick layer, the liquid reservoir chamber and the gap are communicated with each other via a penetration path formed in the heat blocking layer, and a working fluid in the liquid reservoir chamber passes through the penetration path and penetrates into the gap and the wick layer by a capillary force.

20 Claims, 6 Drawing Sheets

(56) References Cited

U.S. PATENT DOCUMENTS

2013/0312939 A1\* 11/2013 Uchida .................. F28D 15/04
                                                                                    165/104.26

FOREIGN PATENT DOCUMENTS

| JP | 3169587 U | | 8/2011 |
| --- | --- | --- | --- |
| JP | 2012193912 | \* | 10/2012 |
| JP | 2013-257129 A | | 12/2013 |
| JP | WO2016051569 | \* | 4/2016 |
| WO | 2008/153071 A1 | | 12/2008 |

\* cited by examiner

HEAT INPUT

HEAT INPUT

EVAPORATOR

TECHNICAL FIELD

The present disclosure relates to an evaporator. More specifically, the present disclosure relates to an evaporator capable of suppressing reduction in the amount of heat transport while preventing an increase in the pressure loss of a working fluid.

BACKGROUND ART

A loop heat pipe system is used as a heat transport means for exhaust heat recovery, etc. For example, a loop heat pipe system is used in order to utilize automotive exhaust heat for engine warm-up, air conditioner, etc. The loop heat pipe system is also used for cooling an automotive inverter.

The loop heat pipe system is equipped with an evaporator and a condenser. For example, in the case of utilizing automotive exhaust heat for engine warm-up, in the evaporator, a liquid working fluid evaporates due to heat of exhaust gas, and vapor of the working fluid is obtained. Vapor of the working fluid is transported to the condenser, and in the condenser, heat is exchanged between the working fluid vapor and the engine cooling water, thereby rapidly raising the temperature of cooling water. Consequently, the engine warm-up time can be shortened and as a result, the fuel consumption rate can be improved. Furthermore, in the condenser, the working fluid is condensed from vapor into liquid due to heat exchange between the liquid working fluid and the engine cooling water, and the liquid working fluid is returned to the evaporator.

Patent Document 1 describes a multilayer wick used for an evaporator of a loop heat pipe system. The multilayer wick has a first layer and a second layer surrounding the first layer, in which the first layer is formed of a high thermally conductive material and the second layer is formed of a low thermally conductive material. Due to this configuration, heat for heating the multilayer wick is prevented from conducting to a liquid working fluid.

Patent Document 2 describes a loop heat pipe structure. The evaporator of the loop heat pipe structure has a first wick layer and a second wick layer disposed while covering the upper part of the first wick layer. The heat conductivity of the second wick layer is lower than the heat conductivity of the first wick layer, and heat is thereby prevented from escaping the first wick layer and heating a liquid working fluid.

RELATED ART

[Patent Document]
[Patent Document 1] Japanese Unexamined Patent Publication No. 2007-309639 (JP 2007-309639 A)
[Patent Document 2] Japanese Registered Utility Model No. 3169587 (JP 3169587 U)

SUMMARY OF THE INVENTION

Problems to be Solved by the Invention

In both of the evaporators descried in Patent Documents 1 and 2, heat can be prevented from conducting to a liquid working fluid. However, since a plurality of wick layers are provided, the thickness of the wick layer as a whole is increased, as a result, the pressure loss of the working fluid increases, and the heat transport distance of the loop heat pipe system decreases.

The present inventors have found that when the thickness of the wick layer as a whole is increased, the pressure loss of the working fluid is disadvantageously increased to decrease the heat transport distance, though reduction in the heat transport amount can be suppressed by preventing heat from conducting to a liquid working fluid.

The evaporator of this disclosure has been accomplished so as to solve the problem above, and an object thereof is to provide an evaporator capable of suppressing reduction in the heat transport amount while preventing an increase in the pressure loss of a working fluid.

Means to Solve the Problems

The present inventors have made many intensive studies to attain the object above and accomplished the evaporator of the present disclosure. The gist thereof is as follows.

<1> An evaporator including:
a container, and
a dividing layer adapted to divide the inside of the container into a liquid reservoir chamber and a vapor chamber, wherein:
the dividing layer comprises a heat blocking layer on the liquid reservoir chamber side and a wick layer on the vapor chamber side,
a gap is formed between the heat blocking layer and the wick layer,
the liquid reservoir chamber and the gap are communicated with each other via a penetration path formed in the heat blocking layer, and
a working fluid in the liquid reservoir chamber passes through the penetration path and penetrates into the gap and the wick layer by a capillary force.

<2> The evaporator according to item <1>, wherein the liquid reservoir chamber is disposed vertically above the vapor chamber.

<3> The evaporator according to item <1> or <2>, further comprising:
an auxiliary container, and
a feed tube allowing the auxiliary container and the liquid reservoir chamber to communicate with each other,
wherein the liquid level of a working fluid in the auxiliary container is present on the vertically upper side relative to the feed tube.

<4> The evaporator according to item <1> or <2>, further comprising a pump adapted to pump the working fluid into the liquid reservoir chamber.

<5> The evaporator according to item <3>, further comprising a pump adapted to pump the working fluid into the auxiliary container.

<6> The evaporator according to any one of items <1> to <5>, wherein the wick layer comprises a sintered body of at least either a metal powder or a semiconductor powder.

<7> The evaporator according to item <6>, wherein the metal and the semiconductor are selected from the group consisting of copper, zinc, nickel, brass, iron, magnesium and silica.

<8> The evaporator according to any one of items <1> to <7>, wherein the heat blocking layer comprises a substance selected from the group consisting of a resin, synthetic rubber, natural rubber, silicone rubber, alumina, glass, and stainless steel.

<9> The evaporator according to any one of items <1> to <8>, wherein the working fluid comprises a substance selected from the group consisting of ammonia, acetone, methanol, water and a fluorine-based solvent.

Effects of the Invention

According to the evaporator of the present disclosure, a heat blocking layer can prevent heat applied to the evaporator from conducting to a working fluid in a liquid reservoir chamber through a wick layer side. As well, according to the evaporator of the present disclosure, a working fluid passes through a penetration path formed in the heat blocking layer, and therefore even when a heat blocking layer is disposed, the increase in the pressure loss of a working fluid can be reduced to a practically no-problematic level. Consequently, according to the evaporator of the present disclosure, an evaporator capable of suppressing reduction in the heat transport amount while preventing an increase in the pressure loss of a working fluid can be provided.

MODE FOR CARRYING OUT THE INVENTION

Embodiments of the evaporator according to the present disclosure are described in detail below. The present disclosure is not limited to the embodiments described below.

Figure 1:
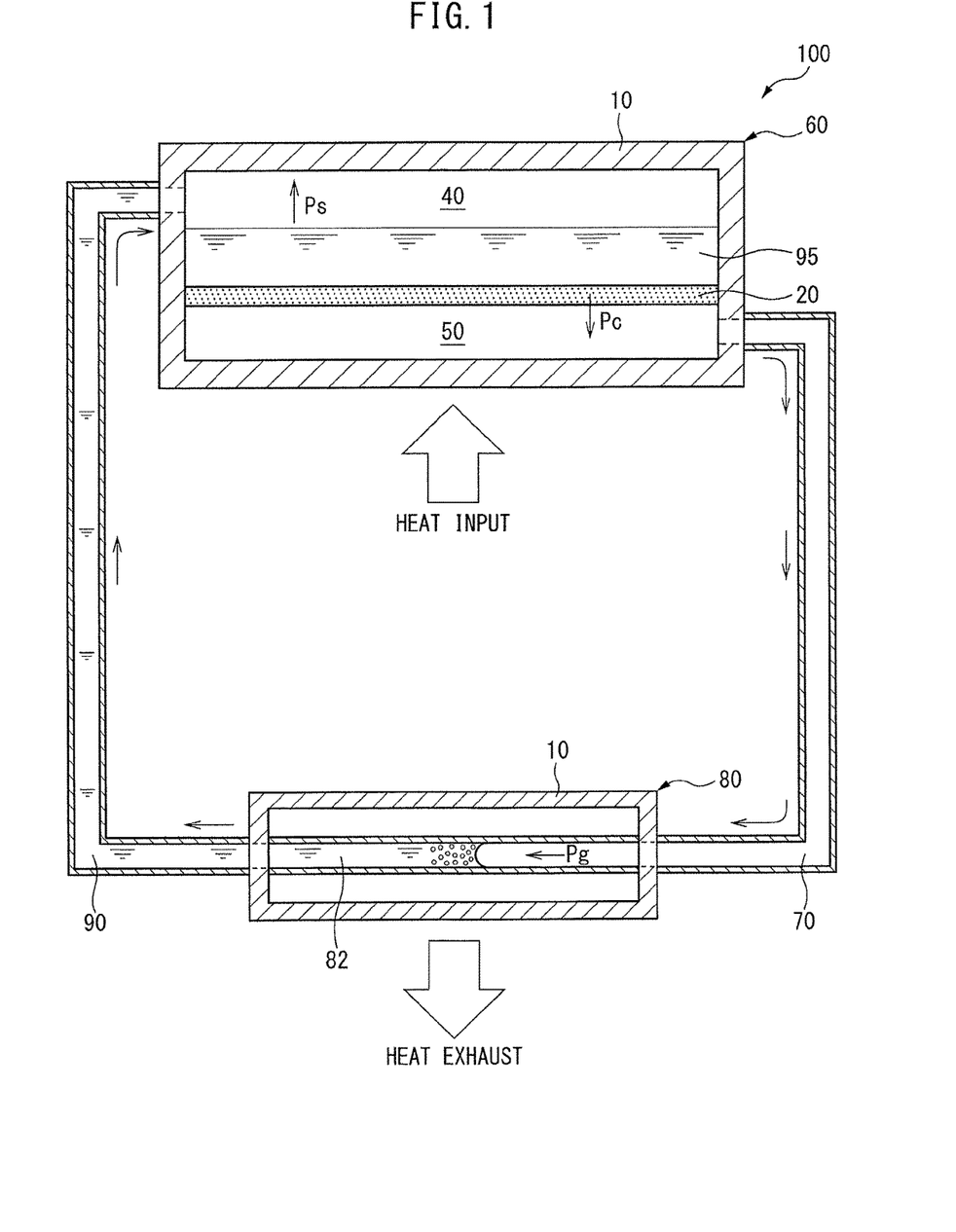
FIG. 1 is a schematic view illustrating one embodiment of the loop heat pipe system.

FIG. 1 is a schematic view illustrating one embodiment of the loop heat pipe system. The loop heat pipe system (100) comprises an evaporator (60) and a condenser (80).

The inside of the evaporator (60) is divided into a liquid reservoir chamber (40) and a vapor chamber (50) by a dividing layer (20). The vapor chamber (50) and the condenser (80) are connected by a vapor tube (70). The condenser (80) and the liquid reservoir chamber (40) are connected by a liquid tube (90). Inside the condenser (80), the vapor tube (70) and the liquid tube (90) are connected to a heat exchanger tube (82).

Inside the evaporator (60), a working fluid (95) in the liquid reservoir chamber (40) penetrates into a wick layer within the dividing layer (20) by a capillary force and evaporates due to heat applied to the evaporator (60). The wick layer is described later. The vapor of the working fluid is sent to the condenser through the vapor tube (70). Inside a heat exchanger tube (82) of the condenser (80), the vapor of the working fluid is condensed to liquid and releases heat of condensation. The liquid working fluid is sent to the liquid reservoir chamber (40) through the liquid tube (90).

The heat transport distance corresponds to the length of the vapor tube (70). When the pressure loss of the working fluid (95) is large, the heat transport distance decreases.

As illustrated in FIG. 1, a working fluid (95) circulates, and the loop heat pipe system (100) is thereby operated. The driving force for operating the loop heat pipe system (100), i.e., the driving force for circulating the working fluid (95), is represented by the following formula (A):

$$(P_g - P_s) + P_c \tag{A}$$

$P_g$: the pressure of vapor of the working fluid (95)
$P_s$: the saturated vapor pressure of the working fluid (95) in the liquid reservoir chamber (40)
$P_c$: the capillary force when the working fluid (95) penetrates into a wick layer within the dividing layer (20)

When the driving force for circulating the working fluid (95) (hereinafter, sometimes simply referred to as "driving force") lowers, the heat transport efficiency is reduced and as a result, the heat transport amount decreases. As taught by formula (A), when $P_s$ rises, the driving force is reduced and as a result, the heat transport amount decreases.

When the temperature of the working fluid (95) in the liquid reservoir chamber (40) rises, $P_s$ rises. When heat applied to the evaporator (60) heats the working fluid (95) in the liquid reservoir chamber (40), in addition to heating a wick layer within the dividing layer (20), the temperature of the working fluid (95) of the liquid reservoir chamber (40) rises. In the following description, the phenomenon where heat applied to the evaporator (60) heats the working fluid (95) in the liquid reservoir chamber (40), in addition to heating a wick layer within the dividing layer (20), is sometimes referred to as "heat leakage".

When heat leakage occurs, not only $P_s$ increases to lower the driving force but also heat necessary for evaporating the working fluid (95) in a wick layer is reduced. Consequently, heat output of the evaporator (60) is reduced, and the heat transport amount of the loop heat pipe system (100) decreases.

In a conventional evaporator (60), various measures have been taken to prevent heat leakage. When the dividing layer (20) was constituted by a thick wick layer, heat leakage could be prevented, but the pressure loss of the working fluid (95) was increased, and the heat transport distance was decreased. When the dividing layer (20) was constituted by a wick layer formed of a low thermal conductivity material, heat leakage could be suppressed, but the liquid working fluid penetrated into a wick layer could hardly evaporate, making it difficult for the evaporator (60) to operate. When the dividing layer (20) was constituted by a multilayer wick comprising a wick layer formed of a high thermally conductive material on the vapor chamber (50) side and a wick layer formed of a low thermally conductive material on the liquid reservoir chamber (40) side, heat leakage could be prevented, but the thickness of the multilayer wick as a whole was increased, causing an increase in the pressure loss of the working fluid (95).

The present inventors have found that when the dividing layer (20) is configured as follows, an evaporator (60) capable of inhibiting heat leakage while suppressing the pressure loss of a working fluid is obtained. The dividing layer (20) comprises a heat blocking layer on the liquid reservoir chamber (40) side and a wick layer on the vapor chamber (50) side, a gap is formed between the heat blocking layer and the wick layer, and the liquid reservoir chamber and the gap are communicated with each other via a penetration path formed in the heat blocking layer.

Figure 2:
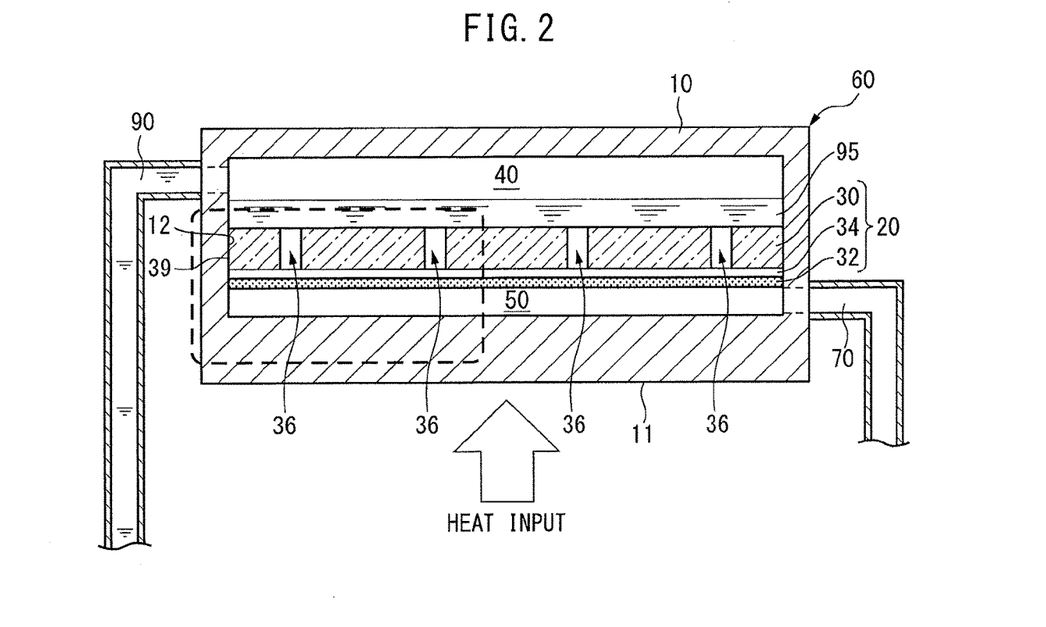
FIG. 2 is a longitudinal cross-sectional view illustrating one embodiment of the evaporator of the present disclosure.
Figure 3:
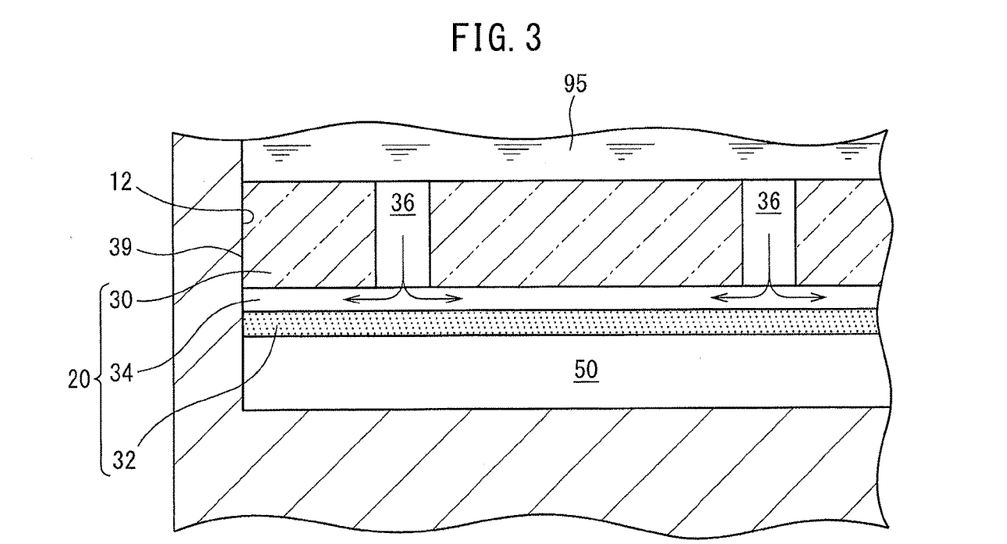
FIG. 3 is a longitudinal cross-sectional view enlarging the portion surrounded by a dashed line of FIG. 2.

The configuration of the evaporator (60) of the present disclosure, which is based on the finding above, is described below. FIG. 2 is a longitudinal cross-sectional view illustrating one embodiment of the evaporator (60) of the present disclosure. FIG. 3 is a longitudinal cross-sectional view enlarging the portion surrounded by a dashed line of FIG. 2. In FIGS. 2 and 3, one embodiment of a flat evaporator is depicted.

The evaporator (60) of the present disclosure comprises a container (10) and a dividing layer (20). Since the evaporator (60) is a flat evaporator, the shape of the container (10) is a box shape, and the dividing layer (20) is in a plate shape. The evaporator (60) of the present disclosure may be incorporated, for example, into a loop heat pipe system (100) illustrated in FIG. 1. In the following, the evaporator (60) of the present disclosure is described by referring to its constituent elements one by one.

(Container)

The container (10) is a main body of the evaporator (60). The outside of the container (10) is heated by a heat source. Inside the container (10), a working fluid (95) is charged. The container (10) is made of a material having heat resistance and corrosion resistance against the working fluid (95). The material of the container (10) includes stainless steel, copper, copper alloy, nickel alloy, etc.

In the case of the embodiment illustrated in FIG. 2, heat is input from the lower side of FIG. 2. In the embodiment illustrated in FIG. 2, the heat input part (11) is set to be thick but is not limited thereto. The thickness, shape, etc., of the heat input part (11) may be appropriately determined according to the positional relationship between the evaporator (60) and a heat source (not depicted), etc.

(Dividing Layer)

The dividing layer (20) divides the inside of the container (10) into a liquid reservoir chamber (40) and a vapor chamber (50). In the case where the evaporator (60) is incorporated, for example, into a loop heat pipe system (100) illustrated in FIG. 1, the liquid reservoir chamber (40) is connected to a liquid tube (90), and the vapor chamber (50) is connected to a vapor tube (70).

The dividing layer (20) comprises a heat blocking layer (30) on the liquid reservoir chamber (40) side and a wick layer on the vapor chamber (50) side. A gap (34) is formed between the heat blocking layer (30) and the wick layer (32).

Figure 4:
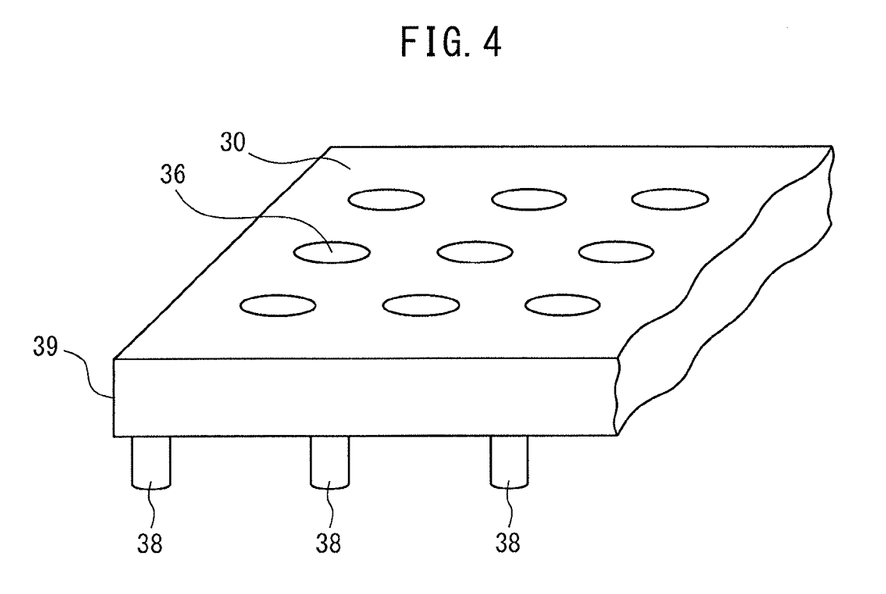
FIG. 4 is a perspective view schematically illustrating the structure of the heat blocking layer.

FIG. 4 is a perspective view schematically illustrating the structure of the heat blocking layer (30). Since a gap (34) is formed between the heat blocking layer (30) and the wick layer (32), in the embodiment depicted in FIG. 4, the heat blocking layer (30) comprises a supporting column (38) on the wick layer (32) side (the lower side in FIG. 4). The method for forming a gap (34) is not limited thereto. In another embodiment, the inner circumferential surface (12) of the container (10) and the outer circumferential surface (39) in the thickness direction of the heat blocking layer (30) may be bonded together with an adhesive, etc.

In the heat blocking layer (30), a penetration path (36) is formed. The penetration path (36) is formed by machining, etc., a plate material or is formed by melting a material constituting the heat blocking layer (30) and injecting the melt into a mold having a core pin. Accordingly, the penetration path (36) is different from capillary pores in a three-dimensional network structure contained in the wick layer (32).

The liquid reservoir chamber (40) and the gap (34) are communicated with each other via the penetration path (36). As illustrated in FIG. 3, a liquid working fluid (95) in the liquid reservoir chamber (40) passes through the penetration path (36). Since the penetration path (36) is not a capillary pore, a capillary force does not act on the liquid working fluid (95) at the time of passing of the liquid working fluid (95) through the penetration path (36).

As illustrated in FIG. 3, the liquid working fluid (95) having passed through the penetration path (36) flows into the gap (34). Due to this inflow, the liquid working fluid (95) spreads on the surface facing the heat blocking layer (30) of the wick layer (32).

The wick layer (32) has a number of capillary pores. Although not being bound by theory, it is considered that when the width of the gap (34) (the separation distance between the heat blocking layer (30) and the wick layer (32)) is set to be around the pore diameter of the capillary pores of the wick layer (32), this provides a state as if the capillary pore and the gap (34) are integrated. In such a state, the liquid working fluid (95) having passed through the penetration path (36) is thought to intrude into the capillary pore of the wick layer (32) while spreading throughout the gap (34) by a capillary force. Thus, the working fluid (95) in the liquid reservoir chamber (40) passes through the penetration path (36) and penetrates into the gap (34) and the wick layer (32) by a capillary force.

(Positional Relationship Between Liquid Reservoir Chamber and Vapor Chamber)

In the embodiment depicted in FIG. 2, the liquid reservoir chamber (40) is disposed vertically above the vapor chamber (50). Consequently, the working fluid (95) in the liquid reservoir chamber (40) resides in contact with the heat blocking layer (30) by the action of gravity. Due to this residence, the working fluid (95) continuously passes through the penetration path (36) and penetrates into the gap (34) and the wick layer (32) by a capillary force.

The liquid reservoir chamber (40) may be of a size, as illustrated in FIG. 2, creating a space on the side (upper side of FIG. 2) of the working fluid (95) opposite to the heat blocking layer (30) or of a size allowing the working fluid (95) to fill the liquid reservoir chamber (40).

The positional relationship between the liquid reservoir chamber (40) and the vapor chamber (50) is not limited to the embodiment depicted in FIG. 2. When the liquid reservoir chamber (40) is set to a size allowing the working fluid (95) to fill the liquid reservoir chamber (40), the liquid reservoir chamber (40) may not be disposed vertically above the vapor chamber (50). For example, the vapor chamber (50) may be disposed vertically above the liquid reservoir chamber (40). When the driving force of the loop heat pipe system (100) is large, the liquid working fluid (95) is efficiently returned to the liquid reservoir chamber (40). This makes it easy for the working fluid (95) to fill the liquid reservoir chamber (40) without taking any other means in particular.

The size of the vapor chamber (50) may be appropriately determined according to the amount of the liquid working fluid (95) evaporated in the wick layer (32). The size of the vapor chamber (50) may be expressed by the separation distance between the inner circumferential surface facing the wick layer (32) (in FIG. 2, the bottom surface of the vapor chamber (50)) of the container (10) and the wick layer (32) (hereinafter, sometimes referred to as the "separation distance between the container (10) inner surface and the wick layer (32)"). The separation distance between the container (10) inner surface and the wick layer (32) may be 0.5 mm or more, 0.7 mm or more, or 1.0 mm or more, and may be 5.0 mm or less, 3.0 mm or less, or 2.0 mm or less.

(Auxiliary Container and Feed Tube)

Figure 5:
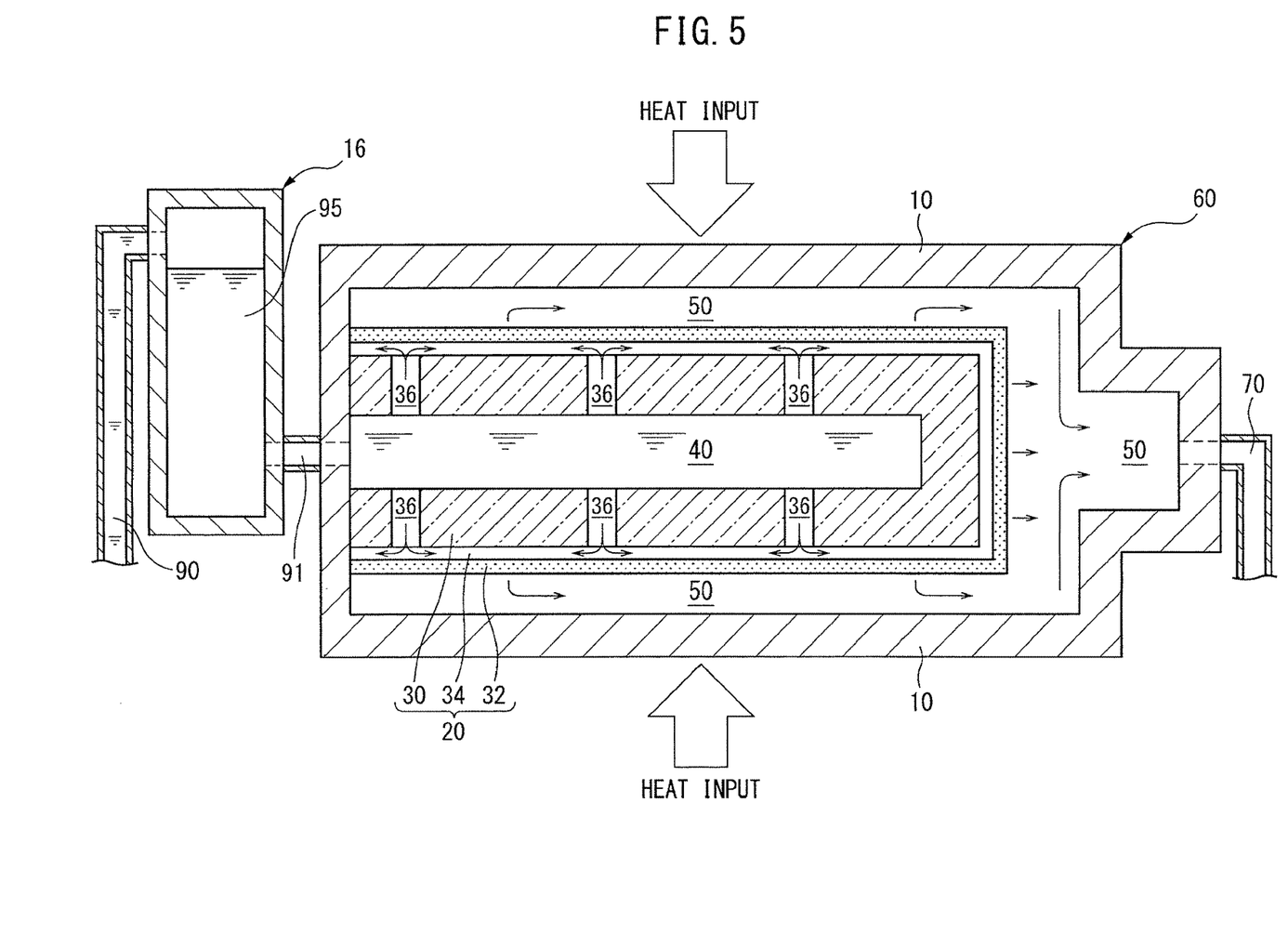
FIG. 5 is a longitudinal cross-sectional view illustrating another embodiment of the evaporator of the present disclosure.

FIG. 5 is a longitudinal cross-sectional view illustrating another embodiment of the evaporator (60) of the present disclosure. In FIG. 5, one embodiment of a cylindrical evaporator is depicted. When the container (10) is cylindrical, a region not having the liquid reservoir chamber (40)

vertically above the vapor chamber (50) is present, and therefore the liquid reservoir chamber (40) needs to be filled with the working fluid (95). In the embodiment depicted in FIG. 5, the evaporator (60) further comprises an auxiliary container (16) and a feed tube (91) connecting the auxiliary container (16) to the liquid reservoir chamber (40). The liquid level of the working fluid (95) in the auxiliary container (16) is present on the vertically upper side relative to the feed tube (91). Consequently, the liquid reservoir chamber (40) is filled with the working fluid (95).

The auxiliary container (16) may be provided also to the evaporator (60) illustrated in FIG. 2. At this time, the liquid reservoir chamber (40) is filled with the working fluid (95). This embodiment is useful when the heat transport distance is very long.

(Pump)

Figure 6:
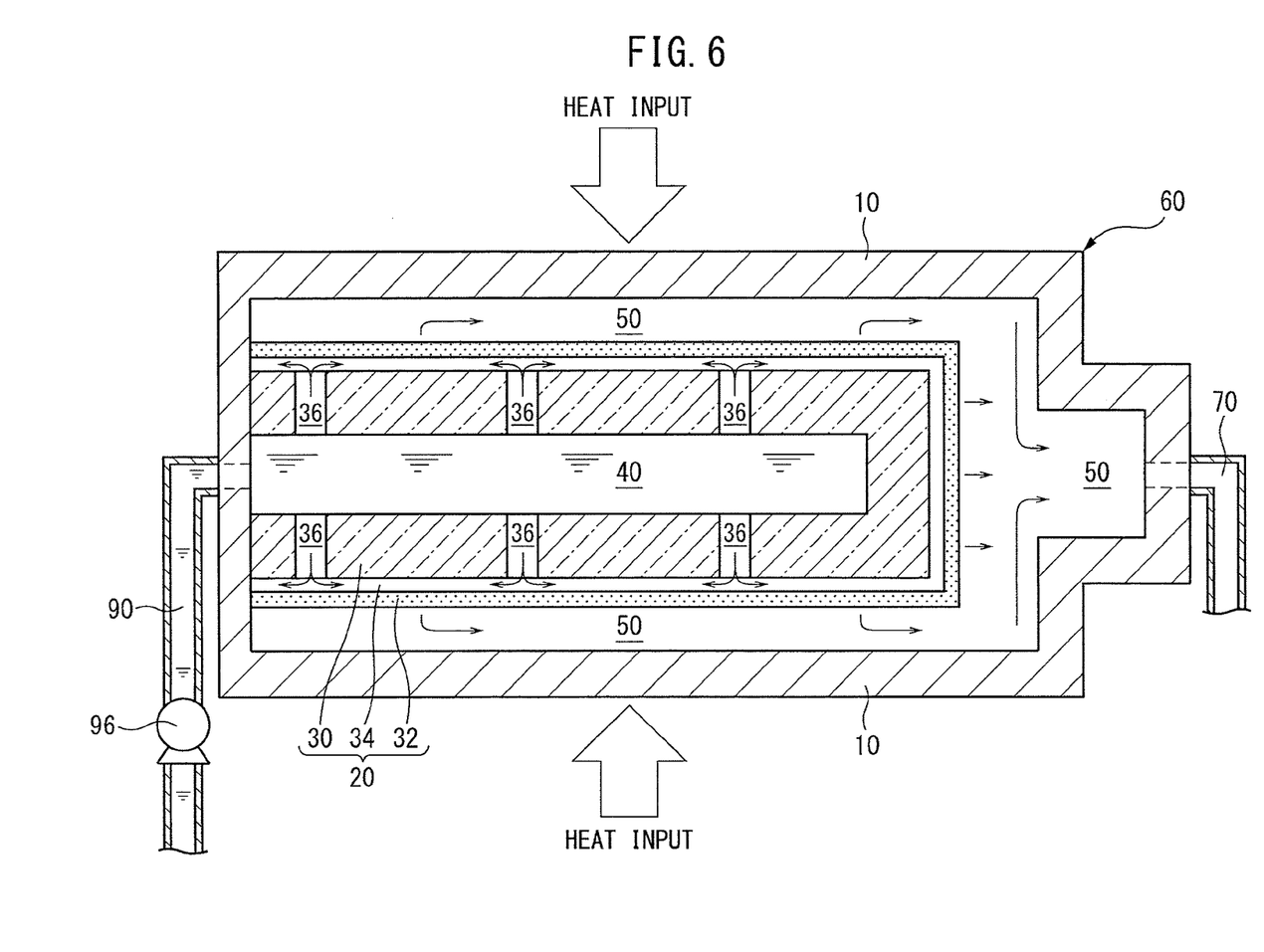
FIG. 6 is a longitudinal cross-sectional view illustrating another embodiment of the evaporator of FIG. 5.

FIG. 6 is a longitudinal cross-sectional view illustrating another embodiment of the evaporator (60) of FIG. 5. The evaporator (60) of FIG. 6 comprises a pump (96) instead of the auxiliary container (16) of the evaporator (60) of FIG. 5. The pump (96) is disposed in the middle of the liquid tube (90). The pump (96) pumps the working fluid (95) into the liquid reservoir chamber (40). Consequently, the liquid reservoir chamber (40) can be filled with the working fluid (95).

The pump (96) may be provided also to the evaporator (60) illustrated in FIG. 2. The pump (96) is disposed in the middle of the liquid tube (90). The liquid reservoir chamber (40) may be of a size allowing the working fluid (95) to fill the liquid reservoir chamber (40) or, as illustrated in FIG. 2, of a size creating a space on the side (upper side of FIG. 2) of the working fluid (95) opposite to the heat blocking layer (30).

In the evaporator (60) illustrated in FIG. 2, even when the vapor chamber (50) is disposed vertically above the liquid reservoir chamber (40), the liquid reservoir chamber (40) can be filled with the working fluid (95) by the pump (96).

In the evaporator (60) illustrated in FIG. 2, even when the liquid reservoir chamber (40) is disposed vertically above the vapor chamber (50) and the heat transport distance is very long, the working fluid (95) is supplied into the liquid reservoir chamber (40) by the pump (96) without interruption.

The pump (96) may be provided also to the evaporator (60) illustrated in FIG. 5. The pump (96) is disposed in the middle of the liquid tube (90). Even when the heat transport distance is very long, the working fluid (95) is pumped into the auxiliary container (16) by the pump (96).

The pump (96) is not particularly limited in its kind, etc., as long as it has corrosion resistance against the working fluid (95) and can pump the working fluid (95). The pump (96) includes a magnet pump, a piston pump, etc.

The embodiments of the heat blocking layer (30), wick layer (32), gap (34) and working fluid (95) are described below. The below-described embodiments of the heat blocking layer (30), etc., are applicable to any evaporator (60) described hereinabove.

(Heat Blocking Layer)

The heat blocking layer (30) comprises a low thermal conductivity material, and thereby, heat is not easily conducted to the working fluid (95) in the liquid reservoir chamber (40) from the wick layer (32). The phrase "heat blocking layer (30) comprises a low thermal conductivity material" means that the heat blocking layer (30) is formed of a low thermally conductive material or comprises a low thermal conductivity material as a main component. A material other than a low thermal conductivity material may also be incorporated inevitably, or as needed, for example, so as to improve the strength of the heat blocking layer (30). The percentage content of the low thermal conductivity material is preferably 90 mass % or more, more preferably 95 mass % or more, relative to the heat blocking layer (30) as a whole.

The thermal conductivity of the material constituting the heat blocking layer (30) may be 30 $W \cdot m^{-1} \cdot K^{-1}$ or less, 20 $W \cdot m^{-1} \cdot K^{-1}$ or less, or 10 $W \cdot m^{-1} \cdot K^{-1}$ or less. Furthermore, the thermal conductivity of the material constituting the heat blocking layer (30) is preferably 1.0 $W \cdot m^{-1} \cdot K^{-1}$ or less, more preferably 0.5 $W \cdot m^{-1} \cdot K^{-1}$ or less, still more preferably 0.3 $W \cdot m^{-1} \cdot K^{-1}$ or less. The thermal conductivity of the material constituting the heat blocking layer (30) is preferably as low as possible but is practically 0.015 $W \cdot m^{-1} \cdot K^{-1}$ or more.

The low thermally conductive material may contain a substance selected from the group consisting of a resin, synthetic rubber, natural rubber, silicone rubber, alumina, glass, and stainless steel. These materials may be used in combination. The thermal conductivities of these materials are shown in Table 1.

TABLE 1

| Class | Material Name | Abbr. | Thermal Conductivity ($W \cdot m^{-1} \cdot K^{-1}$) |
|---|---|---|---|
| Resin | ABS resin | ABS | 0.19 to 0.36 |
| | epoxy resin | EP | 0.3 |
| | tetrafluoroethylene•ethylene copolymer | PTFT | 0.19 to 0.25 |
| | tetrafluoroethylene•hexafluoropropylene copolymer | FEP | 0.25 |
| | polyamide (nylon 6) | PA | 0.25 |
| | polybutylene terephthalate | PBTP | 0.25 |
| | polycarbonate | PC | 0.19 |
| | low-density polyethylene | LDPE | 0.33 |
| | high-density polyethylene (HDPE) | HDPE | 20 |
| | polyether ether ketone | PEEK | 0.26 |
| | polyethersulfone | RESF | 0.18 to 0.24 |
| | polyethylene terephthalate | PETP | 0.31 |
| | phenol resin | PF | 0.13 to 0.25 |
| | tetrafluoroethylene•perfluorovinylether copolymer | PFA | 0.25 |
| | polyimide | PI | 0.28 to 0.34 |
| | acrylic resin | PMMA | 0.17 to 0.25 |
| | polyacetal | POM | 0.23 |
| | polypropylene | PP | 0.125 |
| | polyphenylene sulfide | PPE | 0.29 |
| | polystyrene | PS | 0.10 to 0.14 |
| | polysulfone | PSF | 0.12 to 0.16 |
| | tetrafluoroethylene resin | PTFE | 0.25 |
| | polyvinyl chloride (hard) | PVC | 0.13 to 0.29 |
| | hard urethane | — | 0.018 |
| Rubber | natural rubber | — | 20 |
| | ethylene•propylene rubber (EPDM) | EPDM | 20 |
| | chloroprene rubber (CR) | CR | 20 |
| | butyl rubber (IIR) | IIR | 20 |
| | polyurethane rubber | — | 20 |
| | silicone rubber | — | 20 |
| Ceramic | alumina | — | 30 |
| | glass | — | 1 |
| Metal | stainless steel | — | 16 |

The heat blocking layer (30) comprises a penetration path (36). The penetration path (36) may be formed, for example, by machining, ultrasonic machining, laser machining, and/or punching of a material made of a resin, synthetic rubber, natural rubber, silicone rubber, alumina, glass, stainless steel, etc. The penetration path (36) may also be formed by electric discharge machining of a material made of stainless steel. The penetration path (36) may also be formed by melting a resin, synthetic rubber, natural rubber, silicone rubber, alumina, glass or stainless steel, and injecting the melt into a mold having a core pin. The penetration path (36) is formed in this way, and therefore is different from capillary pores in a three-dimensional network structure contained in the wick layer (32).

The bore diameter, cross-sectional shape, void ratio and thickness of the penetration path (36) are described below. These are not dependent on the kind of the working fluid (95).

When the bore diameter of the penetration path (36) is 0.5 mm or more, 1.0 mm or more, or 1.5 mm or more, pressure loss is less likely to occur and of course, a capillary force does not act on the working fluid (95). On the other hand, when the bore diameter of the penetration path (36) is 5.0 mm or less, 4.0 mm or less, or 3.0 mm or less, heat can hardly conduct from the wick layer (32) side to the working fluid (95) in the liquid reservoir chamber (40) through the penetration path (36). The bore diameter of the penetration path (36) is larger than the capillary pore diameter of the wick layer (32).

The cross-sectional shape of the penetration path (36) may not be circular. In the case where the cross-sectional shape of the penetration path (36) is not circular, the bore diameter of the penetration path (36) is an equivalent-circle diameter of the cross-sectional area thereof. In the case where the cross-sectional area of the penetration path (36) varies in the depth direction, the bore diameter of the penetration path (36) is represented by an equivalent-circle diameter of the minimum cross-sectional area, because the pressure loss depends on the minimum cross-sectional area portion. The thus-determined bore diameter of the penetration path (36) can be compared directly with the later-described capillary pore diameter of the wick layer (32). Here, in the present description, the cross-sectional shape and the cross-sectional area of the penetration path (36) are respectively the shape and the area of a cross-section perpendicular to the travelling direction of the working fluid (95) flowing through the penetration path (36).

When the void ratio of the heat blocking layer (30) is 1% or more, 5% or more, 10% or more, or 15% or more, pressure loss is less likely to occur. On the other hand, when the void ratio of the heat blocking layer (30) is 50% or less, 40% or less, 30% or less, or 25% or less, heat can hardly conduct from the wick layer (32) side to the working fluid (95) in the liquid reservoir chamber (40) through the penetration path (36).

The void ratio (%) of the heat blocking layer (30) is a ratio (%) of the cross-sectional area of the penetration path (36) to the cross-sectional area of the heat blocking layer (30) where the penetration path (36) is not formed. In the case where the cross-sectional area of the penetration path (36) varies in the depth direction, the void ratio is a ratio (%) of the minimum cross-sectional area, because the pressure loss depends on the iminium cross-sectional area portion. In the case of having a plurality of penetration paths (36), the void ratio is a ratio (%) of the total cross-sectional area of respective penetration paths (36) to the cross-sectional area of the heat blocking layer (30) where the penetration path (36) is not formed. The thus-determined void ratio (%) of the heat blocking layer (30) can be compared directly with the void ratio (%) of the wick layer (32). Here, in the present description, the cross-sectional area of the heat blocking layer (30) is an area of a surface perpendicular to the thickness direction of the heat blocking layer (30).

When the thickness of the heat blocking layer (30) is 1.0 mm or more, 1.3 mm or more, or 1.6 mm or more, heat can hardly conduct from the wick layer (32) side to the working fluid (95) in the liquid reservoir chamber (40). On the other hand, when the thickness of the heat blocking layer (30) is 5.0 mm or less, 4.0 mm or less, or 3.0 mm or less, pressure loss is less likely to occur. In the case where the thickness of the heat blocking layer (30) differs depending on the region, the thickness of the heat blocking layer (30) is an average of respective regions.

(Wick Layer)

Since heat from the wick layer (32) is blocked by the heat blocking layer (30), the thermal conductivity of the wick layer (32) may be higher than the thermal conductivity of a material constituting the heat blocking layer (30), and in this case, heat applied to the evaporator (60) can be efficiently conducted to the working fluid (95) within the wick layer (32).

When the thermal conductivity of the wick layer (32) is 50 $W \cdot m^{-1} \cdot K^{-1}$ or more, 75 $W \cdot m^{-1} \cdot K^{-1}$ or more, or 100 $W \cdot m^{-1} \cdot K^{-1}$ or more, heat can be efficiently conducted to the working fluid (95) within the wick layer (32). On the other hand, the thermal conductivity of the wick layer (32) is practically 400 $W \cdot m^{-1} \cdot K^{-1}$ or less.

In the field of loop heat pipe system (100), the thermal conductivity of the wick layer (32) is generally set to be the same as the thermal conductivity of a substance constituting the wick layer (32). Although not being bound by theory, the reason therefor is because when a liquid working fluid (95) permeates into the inside of the wick layer (32), since capillary pores are in a three-dimensional network structure, the liquid working fluid (95) in capillary pores is surrounded by a substance constituting the wick layer (32). Accordingly, the above-described range of thermal conductivity of the wick layer (32) can be regarded as the same as the range of thermal conductivity ($W \cdot m^{-1} \cdot K^{-1}$) of the substance constituting the wick layer (32).

The capillary pore diameter, porosity and thickness of the wick layer (32) are described below. These are dependent on the kind of the working fluid (95).

In the case where the working fluid (95) is water, when the capillary pore diameter is 0.5 μm or more, 1 μm or more, 10 μm or more, or 20 μm or more, pressure loss can be hardly increased. On the other hand, when the capillary pore diameter is 100 μm or less, 80 μm or less, 60 μm or less, or 40 μm or less, the working fluid (95) is less likely to be discharged as a liquid into the vapor chamber (50).

In the case where the working fluid (95) is hypofluorous acid (HFO), when the capillary pore diameter is 0.7 μm or more, 1.0 μm or more, or 1.3 μm or more, pressure loss can be hardly increased. On the other hand, when the capillary pore diameter is 4.0 μm or less, 3.0 μm or less, or 2.0 μm or less, the working fluid (95) is less likely to be discharged as a liquid into the vapor chamber (50). Here, the capillary pore diameter is a value measured by the mercury intrusion method.

In the case where the working fluid (95) is water or hypofluorous acid (HFO), when the porosity of the wick layer (32) is 30% or more, 40% or more, 50% or more, or 60% or more, pressure loss can be hardly increased. On the other hand, when the porosity of the wick layer (32) is 95% or less, 90% or less, 80% or less, or 70% or less, the working fluid (95) is less likely to be discharged as a liquid into the vapor chamber (50). Here, the porosity (%) of the wick layer (32) is a value measured by the mercury intrusion method.

In the case where the working fluid (95) is water, when the thickness of the wick layer (32) is 0.5 mm or more, 1.0 mm or more, 1.5 mm or more, or 2.0 mm or more, the working fluid (95) is less likely to be discharged as a liquid into the vapor chamber (50). On the other hand, when the thickness of the wick layer (32) is 5.0 mm or less, 4.5 mm or less, 4.0 mm or less, or 3.5 mm or less, pressure loss can be hardly increased.

In the case where the working fluid (95) is hypofluorous acid (HFO), when the thickness of the wick layer (32) is 0.1 mm or more, 0.2 mm or more, or 0.4 mm or more, the working fluid (95) is less likely to be discharged as a liquid into the vapor chamber (50). On the other hand, when the thickness of the wick layer (32) is 3.0 mm or less, 2.0 mm or less, or 1.0 mm or less, pressure loss can be hardly increased. Here, in the case where the thickness of the wick layer (32) differs depending on the region, the thickness of the wick layer (32) is an average value of respective regions.

The wick layer (32) having a thermal conductivity, a capillary pore diameter and a porosity in the above-described ranges may comprise a sintered body of at least either a metal powder or a semiconductor powder. The wick layer (32) may be entirely a sintered body but may comprise a reinforcement, etc., in the sintered body as long as penetration of the working fluid (95) is not inhibited.

At least either a metal powder or a semiconductor powder may comprise a small amount of a lubricant and/or a binder as long as penetration of the working fluid (95) and ensuring of the sintered body strength are not inhibited. The lubricant may be added at the time of obtaining a green compact by compression-molding the powder. The binder may be added during compression molding and/or sintering. The content of the metal and semiconductor in the sintered body is preferably 90 mass % or more, more preferably 95 mass % or more.

The metal and semiconductor may be selected from the group consisting of copper (398), zinc (121), nickel (90), brass (120), iron (84), magnesium (151) and silicon (200). The parenthesized numeral after the name of metal or semiconductor is a value of thermal conductivity ($W \cdot m^{-1} \cdot K^{-1}$) of the metal or semiconductor.

Particularly, a sintered body of copper powder, a sintered body of silicon powder, and a sintered body of magnesium powder are preferred, because a wick layer (32) having a high thermal conductivity is obtained. Incidentally, as described above, for example, the thermal conductivity of the sintered body of copper powder is equal to the thermal conductivity of copper. The same applies to metals or semiconductors other than copper.

(Gap)

The thickness of the gap (34) is the separation distance between the heat blocking layer (30) and the wick layer (32) (hereinafter, sometimes simply referred to as "separation distance"). The separation distance depends on the kind of the working fluid (95).

In the case where the working fluid (95) is water or a fluorine-based solvent, the separation distance may be 10 µm or more, 100 µm or more, 200 µm or more, 300 µm or more, or 400 µm or more, and may be 1,000 µm or less, 900 µm or less, 800 µm or less, 700 µm or less, or 600 µm or less. With a separation distance in this range, the working fluid (95) penetrates into the gap (34) by a capillary force. Here, in the case where the separation distance differs depending on the region, the separation distance is an average value of respective regions.

(Working Fluid)

The working fluid (95) is not particularly limited as long as the loop heat pipe system (100) operates normally. The working fluid (95) comprises a substance selected from the group consisting of ammonia, acetone, methanol, water and a fluorine-based solvent. The phrase "comprises a substance selected from the group" means that the working fluid (95) is composed of a substance selected from the group or comprises, as a main component, a substance selected from the group. In order to improve the stability, etc., of heat exchange, the working fluid (95) may comprise inevitably or as needed, a material other than a substance selected from the group. The percentage content of the substance selected from the group is preferably 90 mass % or more, more preferably 95 mass % or more, relative to the working fluid (95) as a whole.

A fluorine-based solvent is an antifreeze solvent and can therefore be used in a cold area, etc. However, the fluorine-based solvent is highly viscous and is therefore readily increased in the pressure loss. In addition, the latent heat of the fluorine-based solvent is small and as a result, the reflux rate of the fluorine-based solvent must be increased in the loop heat pipe system (100). Since the evaporator (60) of the present disclosure comprises a heat blocking layer (30), the wick layer (32) need not to be increased in the thickness or formed in a multilayer configuration. Consequently, pressure loss can hardly occur in the evaporator (60) of the present disclosure and as a result, a fluorine-based solvent can be used. Furthermore, the reflux rate can be increased, because pressure loss can hardly occur.

The fluorine-based solvent includes 1,1,1,2-tetrafluoroethane (HFC-134a), chlorodifluoromethane (freon 22), 1,1,2-trichloro-1,2,2-trifluoroethane (freon 113), 2,2-dichloro-1,1,1-trifluoroethane (HCFC-123), hypofluorous acid (HFO) (Vertrel SINERA), etc.

Figure 7:
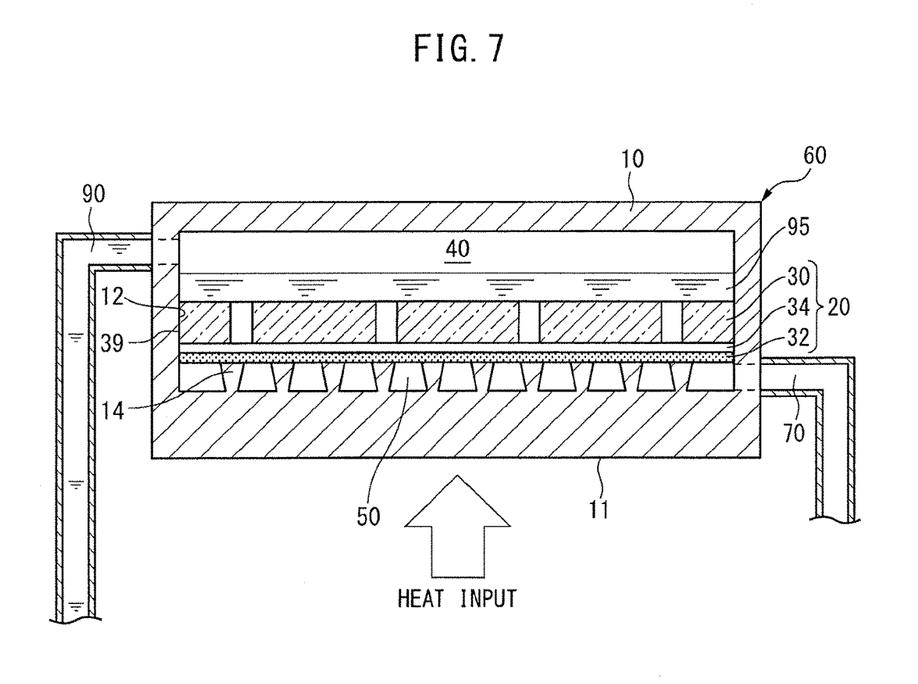
FIG. 7 is a longitudinal cross-sectional view illustrating one embodiment where the vapor chamber of the evaporator of FIG. 2 is modified.

Various modifications can be made in the evaporator (60) of the present disclosure without departing from the gist of the present disclosure. For example, the vapor chamber (50) can be deformed as follows. FIG. 7 is a longitudinal cross-sectional view illustrating one embodiment where the vapor chamber (50) of the evaporator (60) of FIG. 2 is modified.

As depicted in FIG. 7, a plurality of protrusions (14) may be provided inside the vapor chamber (50). The protrusion (14) extends from the heat input part (11) of the container (10).

When protrusions (14) are provided, the area of a surface facing the wick layer (32) of the vapor chamber (50) can be increased to more efficiently conduct heat to the wick layer (32). It is preferred that the tip of the protrusion (14) is as close to the wick layer (32) as possible and the tip of the protrusion (14) is not in contact with the wick layer (32). This configuration facilitates conduction of heat from the tip of the protrusion (14) to the wick layer (32) and at the same time, does not inhibit discharge of vapor of the working fluid (95) from the wick layer (32).

Examples

The evaporator of the present disclosure is described more specifically by referring to Examples. The evaporator of the present disclosure is not limited thereto.

(Preparation of Evaporator)

The evaporator (60) illustrated in FIG. 2 was prepared. This evaporator (60) was incorporated into the loop heat pipe system (100) illustrated in FIG. 1.

The heat blocking layer (30) was prepared using a tetrafluoroethylene.ethylene copolymer (PTFT). The thermal conductivity of the tetrafluoroethylene.ethylene copolymer was 0.19 $W \cdot m^{-1} \cdot K^{-1}$. The penetration path (36) had a circular shape, and the bore diameter thereof was 2 mm. The void ratio and thickness of the heat blocking layer (30) were 20% and 2 mm, respectively.

The wick layer (32) was a sintered body of silicon powder. The thermal conductivity, capillary pore diameter, porosity and thickness of the wick layer (32) were 200 W·m$^{-1}$·K$^{-1}$, 1.5 μm, 62%, and 0.5 mm, respectively.

The thickness (separation distance) of the gap (34) was 500 μm. The size of the vapor chamber was 1 mm in terms of the separation distance between the container (10) inner surface and the wick layer (32).

As the working fluid (95), hypofluorous acid (HFO) (Vertrel SINERA, produced by DuPont) was used.

(Evaluation)

The input voltage and input current were measured by means of an electricity meter, and the heat transport amount was calculated from the measured values. The pressure loss was measured by means of a pressure gage provided on the liquid reservoir chamber (40) side and the vapor chamber (50) side of the wick layer (32). With respect to each of an evaporator (60) having provided therein a heat blocking layer (30) (Example) and an evaporator (60) deprived of a heat blocking layer (30) (Comparative Example), the heat transport amount and the pressure loss were measured.

(Results)

A difference was not observed in the pressure loss between Example and Comparative Example. This could confirm that even when a heat blocking layer (30) is provided, pressure loss is not generated. The heat transport amount was 2,623 W in Example and was 2,055 W in Comparative Example. From these results, it could be confirmed that in the evaporator (60) of the present disclosure, reduction in the heat transport amount can be suppressed while preventing an increase in the pressure loss of the working fluid.

That is, the effects of the evaporator of the present disclosure could be verified from the results above.

DESCRIPTION OF NUMERICAL REFERENCES

10 Container
11 Heat input part
12 Inner circumferential surface
14 Protrusion
16 Auxiliary container
20 Dividing layer
30 Heat blocking layer
32 Wick layer
34 Gap
36 Penetration path
38 Supporting column
39 Outer circumferential surface
40 Liquid reservoir chamber
50 Vapor chamber
60 Evaporator
70 Vapor tube
80 Condenser
82 Heat exchange tube
90 Liquid tube
91 Feed tube
95 Working fluid
96 Pump

What is claimed is:

1. An evaporator comprising:
    a container, and
    a dividing layer adapted to divide the inside of the container into a liquid reservoir chamber and a vapor chamber, wherein:
    the dividing layer comprises a heat blocking layer on the liquid reservoir chamber side and a wick layer on the vapor chamber side,
    the heat blocking layer includes a plate or cylinder that extends horizontally,
    a gap is formed between the plate or cylinder of the heat blocking layer and the wick layer such that a separation distance between the plate or cylinder and the wick layer, in a vertical direction, is less than or equal to 1,000 μm and more than or equal to 10 μm,
    the liquid reservoir chamber and the gap are communicated with each other via a penetration path formed in the heat blocking layer, and
    a working fluid in the liquid reservoir chamber passes through the penetration path and penetrates into the gap and the wick layer by a capillary force.

2. The evaporator according to claim 1, wherein the liquid reservoir chamber is disposed vertically above the vapor chamber.

3. The evaporator according to claim 1, further comprising:
    an auxiliary container, and
    a feed tube allowing the auxiliary container and the liquid reservoir chamber to communicate with each other,
    wherein the liquid level of a working fluid in the auxiliary container is present on the vertically upper side relative to the feed tube.

4. The evaporator according to claim 1, further comprising a pump adapted to pump the working fluid into the liquid reservoir chamber.

5. The evaporator according to claim 3, further comprising a pump adapted to pump the working fluid into the auxiliary container.

6. The evaporator according to claim 1, wherein the wick layer comprises a sintered body of at least one from among a metal powder and a semiconductor powder.

7. The evaporator according to claim 6, wherein the sintered body is made of at least one from among copper, zinc, nickel, brass, iron, magnesium and silica.

8. The evaporator according to claim 1, wherein the heat blocking layer comprises a substance selected from the group consisting of a resin, synthetic rubber, natural rubber, silicone rubber, alumina, glass, and stainless steel.

9. The evaporator according to claim 1, wherein the working fluid comprises a substance selected from the group consisting of ammonia, acetone, methanol, water and a fluorine-based solvent.

10. The evaporator according to claim 2, further comprising:
    an auxiliary container, and
    a feed tube allowing the auxiliary container and the liquid reservoir chamber to communicate with each other,
    wherein the liquid level of a working fluid in the auxiliary container is present on the vertically upper side relative to the feed tube.

11. The evaporator according to claim 2, further comprising a pump adapted to pump the working fluid into the liquid reservoir chamber.

12. The evaporator according to claim 2, wherein the wick layer comprises a sintered body of at least one from among a metal powder and a semiconductor powder.

13. The evaporator according to claim 3, wherein the wick layer comprises a sintered body of at least one from among a metal powder and a semiconductor powder.

14. The evaporator according to claim 4, wherein the wick layer comprises a sintered body of at least one from among a metal powder and a semiconductor powder.

15. The evaporator according to claim 5, wherein the wick layer comprises a sintered body of at least one from among a metal powder and a semiconductor powder.

16. The evaporator according to claim 1, wherein the plate or cylinder of the heat blocking layer does not directly contact the wick layer.

17. The evaporator according to claim 1, wherein the heat blocking layer does not directly contact the wick layer.

18. The evaporator according to claim 1, wherein the heat blocking layer includes the plate that extends horizontally.

19. The evaporator according to claim 1, wherein the heat blocking layer includes the cylinder that extends horizontally.

20. The evaporator according to claim 1, wherein the plate or cylinder of the heat blocking layer has a thickness in the vertical direction of less than or equal to 5.0 mm.

* * * * *